(12) United States Patent
Koehne et al.

(10) Patent No.: US 12,286,052 B2
(45) Date of Patent: Apr. 29, 2025

(54) LIGHT ASSEMBLY, VEHICLE DESIGN ELEMENT, REAR VIEW DEVICE AND DOOR FINISHER

(71) Applicant: MOTHERSON INNOVATIONS COMPANY LIMITED, London (GB)

(72) Inventors: Shane Randell Koehne, Lonsdale (AU); Gary Dekievit, Lonsdale (AU); Matthew Chapman-Winter, Lonsdale (AU)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 18/499,356

(22) Filed: Nov. 1, 2023

(65) Prior Publication Data

US 2024/0059212 A1  Feb. 22, 2024

Related U.S. Application Data

(63) Continuation of application No. 17/635,283, filed as application No. PCT/EP2020/074143 on Aug. 28, 2020, now Pat. No. 11,840,171.

(30) Foreign Application Priority Data

Aug. 30, 2019 (DE) ..................... 10 2019 123 382.8

(51) Int. Cl.
*B60Q 1/26* (2006.01)
*B60Q 1/32* (2006.01)
(Continued)

(52) U.S. Cl.
CPC .............. *B60Q 1/26* (2013.01); *B60Q 1/323* (2013.01); *B60Q 3/62* (2017.02); *F21S 43/237* (2018.01);
(Continued)

(58) Field of Classification Search
CPC .......... B60Q 3/20; B60Q 1/2665; B60Q 3/54; B60Q 1/0011; B60Q 3/62; B60Q 1/26; B60Q 1/32
See application file for complete search history.

(56) References Cited

U.S. PATENT DOCUMENTS 5,590,945 A   1/1997  Simms
5,915,832 A   6/1999  Baird, Sr.
(Continued)

FOREIGN PATENT DOCUMENTS

DE  102016212527 A1  1/2018
EP      1946965 A2   7/2008
EP      3073183 A1   9/2016

OTHER PUBLICATIONS

German Office Action dated Apr. 21, 2020 of DE 10 2019 120 382.1.
(Continued)

*Primary Examiner* — William J Carter
(74) *Attorney, Agent, or Firm* — Jones Day

(57) ABSTRACT

A system comprising a light assembly for illumination of a vehicle design element includes a plurality of light pipes, each comprising a core; one or more light sources, each of the one or more light sources being disposed adjacent to and directed toward one or more of the plurality of the light pipes, wherein light emitted from the one or more light sources is split into reflected light that propagates within the core of one or more of the plurality of light pipes and diffuse light that exits one or more of the plurality of light pipe; and a lens having an inner surface and an outer surface disposed opposite the inner surface, the lens including a continuous transparent and/or translucent coating on the outer surface The continuous transparent and/or translucent coating is at least partially permeable to at least some of the diffuse light which is passed through the lens. The continuous transparent and/or translucent coating comprises a metal, an alloy or a (Continued)

conductive metalloid, providing a chromium or chromium-based reflective coating. End portions of at least two of the plurality of light sources overlap, providing at least one region of overlap.

21 Claims, 2 Drawing Sheets

(51) Int. Cl.
- *B60Q 3/62* (2017.01)
- *F21S 43/237* (2018.01)
- *F21S 43/245* (2018.01)
- *F21V 3/04* (2018.01)
- *F21V 8/00* (2006.01)
- *F21Y 115/10* (2016.01)

(52) U.S. Cl.
CPC ........... *F21S 43/245* (2018.01); *F21V 3/049* (2013.01); *G02B 6/001* (2013.01); *F21V 2200/15* (2015.01); *F21Y 2115/10* (2016.08)

(56) References Cited

U.S. PATENT DOCUMENTS

| | | |
|---|---|---|
| 6,854,869 B1 | 2/2005 | Fernandez |
| 7,654,679 B2 | 2/2010 | Mezouari |
| 8,485,680 B2 | 7/2013 | Anderson et al. |
| 9,004,731 B2 | 4/2015 | Pfeil |
| 9,310,041 B2* | 4/2016 | Pfeil ................. B60Q 3/64 |
| 9,562,663 B2 | 2/2017 | Gebauer et al. |
| 10,935,307 B2 | 3/2021 | Xue |
| 2002/0025132 A1* | 2/2002 | Zarian ................. G02B 6/02 |
| | | 385/128 |
| 2002/0102058 A1 | 8/2002 | Hulse |
| 2012/0250345 A1 | 10/2012 | Peron et al. |
| 2012/0280528 A1* | 11/2012 | Dellock ................. B60R 13/04 |
| | | 362/516 |
| 2013/0058115 A1* | 3/2013 | Pfeil ................. G02B 6/001 |
| | | 362/511 |
| 2013/0229815 A1 | 9/2013 | Pfeil |
| 2013/0314935 A1 | 11/2013 | Tokieda et al. |
| 2014/0056016 A1 | 2/2014 | Marcori et al. |
| 2015/0258932 A1 | 9/2015 | Kim et al. |
| 2017/0108191 A1 | 4/2017 | Nishihata |
| 2017/0205042 A1* | 7/2017 | Kim ................. F21S 43/255 |
| 2018/0017226 A1 | 1/2018 | Valois et al. |
| 2018/0229648 A1 | 8/2018 | Meier et al. |

OTHER PUBLICATIONS

International Search Report dated Nov. 13, 2020 of International application No. PCT/EP2020/074143.
Written Opinion dated Nov. 13, 2020 of International application No. PCT/EP2020/074143.
3M™ Light String Product Information Sheet 2013.

* cited by examiner

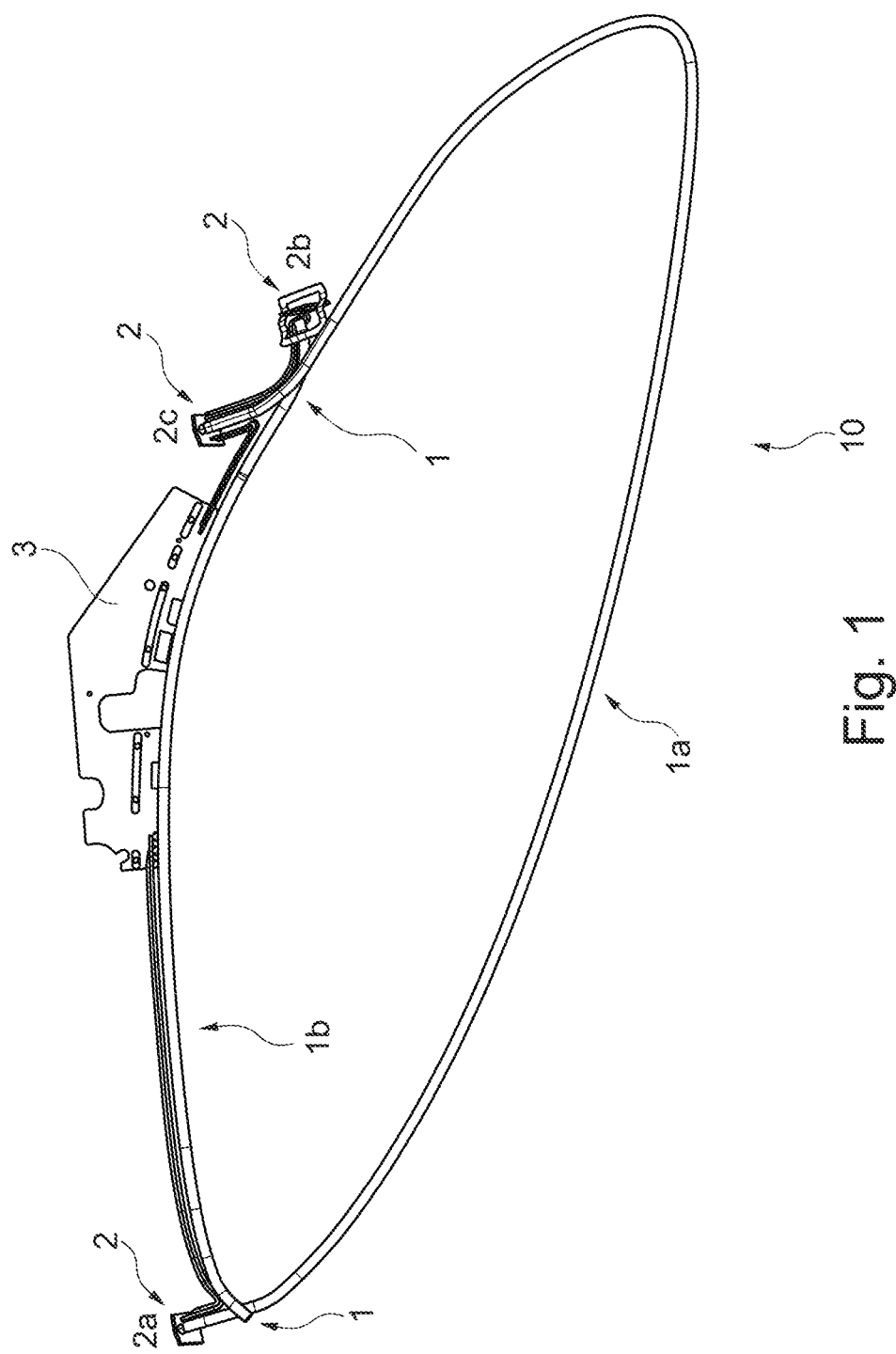

LIGHT ASSEMBLY, VEHICLE DESIGN ELEMENT, REAR VIEW DEVICE AND DOOR FINISHER

CROSS-REFERENCE TO RELATED APPLICATIONS

This application is a continuation of U.S. application Ser. No. 17/635,283, filed on Feb. 14, 2022, which is a National Stage Entry of International Patent Application No. PCT/EP2020/074143, filed on Aug. 28, 2020, which claims the benefit of priority to German Patent Application No. DE 10 2019 123 382.8 filed on Aug. 30, 2019, each of which is hereby incorporated by reference in its entirety for all purposes.

BACKGROUND

1. Field

The present disclosure relates to a system comprising a light assembly for a design element, in particular configured for a vehicle design element, selected from vehicle emblems, badges, logos and the like and/or other vehicular light components, such as in rear view devices, which can provide a uniform light output without the use of light guide optic features and without the light source being viewable. In particular the present disclosure refers to a system in which 360° illumination can be achieved. It also refers to a vehicle design element, a rear view device and a door finisher.

2. Related Art

Vehicles, such as passenger cars, vans and trucks, include various interior and exterior vehicular lighting components capable of emitting light for various purposes. Additionally, such aforementioned vehicles often include various interior and exterior vehicular components having a metallic reflective coating coated thereon exhibiting a chrome or mirror-like surface finish. In such systems it is desirable that the overall number of visible lighting components is reduced. Metallic reflective coatings which provide such features are known from, for example, WO 2011/075796 and WO 2013/110122.

For example, an aesthetic feature which has become desirable in automotive applications is to provide exterior and/or interior badges and/or emblems on vehicles or specific parts of a vehicle. Such aesthetic features are backlighting of key features of the particular badge or emblem or are illuminated for optical or safety aspects. For example, parts or all of door finishers may be illuminated in such a way. It is desirable that these elements are backlit with an even (uniform or homogenous) luminance using, for example light emitting diodes (LEDs) input. An LED is a directional light source having a relative luminous intensity that decreases as the viewing angle is increased. This may result in the appearance of bright or hot spots to an external viewer of the badge.

Lighting systems that provide a uniform luminous intensity are known, for example systems using expensive organic light emitting diode (OLED) technology or complex lens and reflector arrangements. Highly diffusing materials are also used but these have the drawback of giving a milky or hazy appearance and have poor optical efficiency. Optic features may also be used on cl ear materials to diffuse light, but these have the drawback that the optic features are visible in the unlit state which is undesirable. A further desirable feature is that the LED input is not directly visible to the external viewer of the badge or emblem.

Light pipes are used in such systems to deliver the light from the light source over distances to the place of illumination. Thereby light pipes rely on total internal reflection. 360° illumination with a light pipe is difficult to achieve with multiple light sources, because the light sources may stand in the path of the light. In addition, light efficiency may be reduced. EP 1099902 describes a system in which a light pipe uses total reflection to provide light transmission. EP 2020610 describes a lighting device having a bend and which uses a facet to transport the light US 2017/0108191 A1 refers to a vehicular light guide member which is constituted from two light guide members. Each of the overlapping surfaces of each of the two light guide members is slanted with respect to the light-guiding direction of the two light guide members. The overlapping surface of the upper side light guide member covers the overlapping surface of the lower side light guide member from the emission direction side where the emission light from the two light guide members is emitted outward.

US 2013/0314935 A1 describes a vehicle lighting unit which can include LEDs and at least two long light guide bodies arranged adjacent to each other. At least two light transmitting lenses can be disposed in front of the at least two light guide bodies. The at least two light guide bodies each can include a gap portion interposed therebetween. A first end portion of the light transmitting lens can be positioned at the gap portion so that the first end portions of the light transmitting lenses overlap with each other in a front-rear direction. The first end portions of the at least two light transmitting lenses can have a surface processed portion on its front surface. The surface processed portions can be configured to direct light exiting through the respective first end portions of the at least two light guide bodies forward.

U.S. Pat. No. 9,562,663 B2 is directed toward a lighting device of motor vehicle with an arrangement of at least two light conductors. Each conductor includes one coupling arm having a first cross section, a light conductor area with a second cross section, and a transition area located between the coupling arm and the light conductor area. The coupling arms include a respective first contact surface, and the transition areas of the light conductors include a respective second contact surface. The contact surfaces are formed in such a way that the coupling arm of the one light conductor inserts into the transition area of the respective other light conductor. Each one of the two coupling arms include deflectors on a rear side of the coupling arm, which deflect towards the front side, within a section of the transition area where each respective coupling arm fits into the other light conductor.

U.S. Pat. No. 9,004,731 B2 refers to an illumination device which can be arranged along a contour of a component in a motor vehicle so that the contour of the component is recognizable in the dark as a bright strip. The illumination device allows producing a light strip along a predetermined distance. For this, the illumination device has a longitudinally shaped light conductor for distributing light along the distance and a coupling-in element which is connected to the light contour for coupling light into the light conductor. The light conductor is supported positionally fixed relative to the component in a region by means of a fixed-bearing device. The coupling in element on the other hand is supported by means of a floating-bearing device for movement relative to the component along at least one direction.

US 2018/0229648 A1 teaches a multifunctional lamp unit which includes a side turn indicator including a housing for at least one light conductor with at least one illuminant, and a projection unit.

US 2017/0205042 A1 describes a lighting system having elongated lightguides disposed in elongated optical cavities that exhibit a uniform surface emission, a vehicle light assembly using the lighting system, and automotive exterior lamps incorporating the vehicle light assemblies. In one particular embodiment, the lighting system includes an elongated lightguide disposed in a reflective elongated optical cavity. The reflective elongated optical cavity can include a diffuse output surface, and the lighting system can have one or more LEDs positioned to inject light into the elongated lightguide.

It is against this background and the problems and difficulties associated therewith that the present disclosure has been developed.

SUMMARY

It is the object of this disclosure to further develop a system to overcome the drawbacks of the prior art.

This object is solved by a system comprising a light assembly for a 360° illumination of a design element, in particular configured for a vehicle design element, comprising: one or more light pipes, wherein each light pipe comprises a core, and two or more light pipes and/or two end portions of one light pipe at least partially overlap, providing at least one region of overlap to substantially close a loop; one or more light sources, disposed at least partially within an interior of the system, wherein each light source is configured to emit light based on at least receiving electrical power from an electrical power source, and each light source is arranged adjacent to and directed towards at least one of the one or more light pipes such that the emitted light results in reflected light propagating within the core and diffuse light exiting the one or more light pipes along the same; and a lens substantially enclosing the interior, the one or more light pipes and the one or more light sources, wherein the lens, having an inner surface and an outer surface disposed opposite the inner surface, is provided with a continuous transparent and/or translucent coating on the outer surface, and with the one or more light sources receiving electrical power from the electrical power source, the continuous transparent and/or translucent coating is at least partially permeable to at least some of the diffuse light which is passed through the lens; wherein the continuous transparent and/or translucent coating depends on at least one characteristic of the one or more light pipes and/or the one or more light sources, and/or the transparent and/or translucent coating comprises a metal, an alloy or a conductive metalloid, preferably providing a chromium or chromium-based reflective coating, to provide a homogenous illumination of at least one 360° illumination window when the one or more light sources receive electrical power from the electrical power source.

According to one embodiment the system further comprises a cladding, optics, a plurality of screen printed dots, a paint and/or a further coating on the one or more light pipes for providing a diffuse, homogenous light output from the one or more light pipes, wherein the continuous transparent and/or translucent coating preferably depends on the cladding, the optics, the screen printed dots, the paint and/or the further coating.

Each light pipe may comprise a cladding surrounding its core such that the emitted light is at least partly reflected by the cladding to propagate within the core, with the cladding preferably being made from a material selected from the group comprising a fluoropolymer, fluorocarbon polymer and substituted polymer, and/or the cladding has a different refractive index compared to the core of each light pipe.

Each light pipe can be flexible and/or cylindrical.

Further, it is proposed that the light from the one or more light sources is output from the one or more light pipes with a substantially uniform luminance, and/or the light from the one or more light pipes is color stable.

This disclosure also provides embodiments comprising at least one mask providing the illumination window, with the mask being located between the one or more light pipes and the lens and/or provided by the continuous transparent and/or translucent coating.

The at least one mask can provide the illumination window with varying transmission levels, with preferably the window being less transmissive in each region of overlap for providing the homogenous illumination of the illumination window.

The width of the illumination window may be not greater than the width of each light pipe, and/or the illumination window has an at least partly circular and/or oval shape.

Still further embodiments can comprise at least one gasket located at the inner part of the system, in particular between the one or more light pipes and the at least one mask.

In addition, a plurality of small contact areas may be provided between the one or more light pipes and the coating, a reflector and/or the at least one mask in order to contain light within the core of the one or more light pipes, with the continuous transparent and/or translucent coating preferably depending on plurality of small contact areas.

It is proposed that the plurality of small contact areas is formed by applying a velvet film, by providing a velvet surface finish or by grain or sand blast of molded or casted parts, the at least one mask, the one or more light pipes, or the at least one reflector.

The plurality of small contact areas can be applied on the mask.

Still further, it is proposed that the one or more light sources comprise at least one of an incandescent light source, a light-emitting diode (LEDs), an organic light-emitting diodes (OLED) and/or a LASER diode, and/or the one or more light sources or each light source is located on a circuit board.

The at least one characteristic of the one or more light pipes may be determined by the amount of light pipes, the amount of regions of overlap, the location of each region of overlap, shape and/or dimensions of each region of overlap, and/or shape and/or dimensions of each light pipe, and/or that least one characteristic of the one or more light sources may be determined by the amount of light sources, type of each light source and/or location and/or orientation of each light source.

The disclosure also provides a vehicle design element comprising the system of the disclosure. In addition, the disclosure also provides a rear view device and a door finisher of a vehicle comprising the system of provided herein.

The system according to the disclosure is a system in which the interior of the system, for example the light source, light guide etc., which is switchable between an on state and an off state, is hidden until illumination is turned on so that the light produced in the inside the system can be seen from outside ("Hidden Till Lit" (HTL)). Thus, for example, any logo or emblem which was hidden will be visible only then.

This HTL feature of the system is provided by a transparent and/or translucent coating applied to the lens, either on the outside or the inside. Preferably the coating is provided on the outside of the lens. Such transparent and/or translucent coating is a coating that has a certain reflectivity so that, for example, the light source or light pipe cannot be seen from one side but that has also a certain degree of translucence so that the light from the light source and/or the light pipe can be seen once lit.

In embodiments of the present disclosure, the front surface of the lens is a polished, textured or machined surface. When the transparent and/or translucent coating is deposited on a polished, textured or machined substrate surface it provides a visible surface that is either a highly polished metal looking surface or a textured metal surface that replicates metal finishing, for example brushed stainless steel.

The lens may be made out of clear and/or translucent polymeric material. The polymeric material may be formed from a material selected from the group consisting of polyacrylate, polyester, polystyrene, polyethylene, polypropylene, polyamides, polyamides, polycarbonate, epoxy, phenolic, acrylonitrile-butadiene-styrene, acrylonitrile-styrene-acrylates, acetal and blends of these, but is not limited thereto. For example, the lens may be formed from a material selected from the group consisting of polycarbonate, poly(2,2'-dihydroxyphenylpropane) carbonate, polydiethyleneglycol bis(allyl carbonate), polymethylmethacrylate and polystyrene, or blends thereof.

The disclosure also proposes that the lens may have an outer component, preferably made from a clear material mentioned above, and an inner component, preferably over molded on the inner surface of the outer component and/or made from opaque material. The lens inner component material optic properties can be selected to additionally increase or decrease the reflected light back into the light pipe. A highly reflective material will increase the final light output level, a non-reflective material will reduce the overall final light output level.

The lens may be formed by any process known in the art, such as, for example, injection molding and/or thermoforming, but is not limited thereto.

The lens may include a pre-coated film in the form of either a hardcoat, a silicon hardcoat, an inorganic oxide, or a thin metal film, or a combination of such pre-coated films.

The transparent and/or translucent coating may be any coating that provides the desired HTL functionality. For example, the transparent and/or translucent coating may be a transparent and/or translucent metal layer formed from a metal, alloy or conductive metalloid selected from the group consisting of chromium, iridium, aluminum, titanium, nickel, molybdenum, zirconium, tungsten, niobium, tantalum, cobalt, manganese, silver, zinc, silicon, and mixtures thereof; an oxide, nitride, boride and/or carbide thereof and mixtures thereof, and/or alloys of any of the aforementioned metals, steel, or stainless steel. In one embodiment, the transparent and/or translucent coating is a chromium or chromium-based reflective coating, and both the polymeric substrate and the chromium or chromium-based reflective coating are at least in part permeable to light originating from the at least one light pipe.

For example, the transparent and/or translucent coating may be an alloy of chromium and a dopant material, the dopant material being selected from the hexagonally close-packed transition metals, the alloy having a crystal structure of a primary body-centered cubic phase in coexistence with a secondary omega hexagonally close-packed phase. The alloy may be a binary alloy of chromium and the dopant material.

The atomic percentage of the dopant material in the binary alloy may range from about 1.9 at. % to about 5.8 at. %. The dopant material may be selected from hexagonally close-packed transition metals zirconium, titanium, cobalt, hafnium, rubidium, yttrium and osmium. In one embodiment the dopant material may be selected from hexagonally close-packed transition metals zirconium, titanium and cobalt. For example, the alloy may be a binary alloy and the dopant material is zirconium where the atomic percentage of the zirconium in the binary alloy is in the range of from about 4.5 at. % to about 5.8 at. %. In a further embodiment, the alloy may be a binary alloy and the dopant material may be titanium, and where the atomic percentage of the titanium in the binary alloy is in the range of from about 1.9 at. % to about 5.8 at. %. In a still further embodiment, the alloy may be a binary alloy and the dopant material may be cobalt, where the atomic percentage of the cobalt in the binary alloy may be in the range of from about 1.9 at. % to 5.7 at. %.

The coating may have a thickness of 200 nm, 100 nm, be in the range of from 40 nm to 80 nm, be in the range of from 50 nm to 70 nm, or be about 60 nm.

The coating may have a minimum light transmission of 5% to a maximum of 100%. In some embodiments, the light transmission of the coating is from 5% to 20%. The light transmission of the transparent and/or translucent coating may be 5%, 6%, 7%, 8%, 9%, 10%, 11%, 12%, 13%, 14%, 15%, 16%, 17%, 18%, 19% or 20%. In specific embodiments, the light transmission of the transparent and/or translucent coating is about 8%. The transmission may depend on the coating used and thus can be adjusted.

The transparent and/or translucent coating may be part of a multilayer transparent and/or translucent stack on the front surface of the lens. The multilayer stack may comprise other layers such as hardcoat layers, and the like. For example, a hard coat can be applied to the lens either on top of the transparent and/or translucent coating or between the lens and the transparent and/or translucent coating. The hard coat may be formed from one or more abrasion resistant layers. As is known in the art, a primer layer may be used between the hard coat and the lens or the transparent and/or translucent coating to enhance adhesion of the hard coat. The hard coat can be formed from one or more of a range of materials known for this purpose in the art, including an organosilicon, an acrylic, a urethane, a melamine or an amorphous organosilicon (SiOxCyHz). Organosilicon hard coats are particularly suitable and suitable materials include Silicone Hard Coat SHC 5020 from Momentive and GE587B from MomentiveGE Bayer. The hard coating material may be applied in a solvent, such as an alcohol solvent. The hard coat can be applied using any of the coating techniques known in the art, including flow coating, dip coating, spray coating, spin coating, etc. and then cured using techniques known in the art, such as heating to a temperature of about 100° C. to about 200° C. for the appropriate required period of time. Intermediate layers may be deposited between the respective layers of the multilayer stack. The intermediate layers may assist in adhesion between the respective layers and minimize or prevent delamination. The intermediate layers will generally be translucent and may be formed from silica.

The transparent and/or translucent coating can be deposited using any suitable elemental deposition technique, including Physical Vapour Deposition (PVD), Chemical Vapour Deposition (CVD), or the like.

For example, the lens may be positioned in one or more sputter deposition chambers with either planar or rotary magnetron targets, and with deposition of the transparent and/or translucent coating being achieved via DC sputtering from an elemental target. Other processes for applying or depositing coating layers can also be used. The thickness of the layer will determine the transparency and/or translucency of the layer. In one embodiment, a thickness of 2 nm to 50 nm provides a conductive transparent and/or translucent layer that allows sufficient light to pass through. A thickness of about 30 nm is particularly suitable.

The two or more light sources may be any source that can be used to provide the required amount of light, either light of one color or lights of different color. According to the disclosure at least two light sources may be used, wherein three or more light sources may also be encompassed by the present disclosure. For example, if three or more light sources are used, each light source may provide light in a different color and/or in a different brightness. In one embodiment the quality of light entering the light pipe is more important than the amount of light for an even illumination.

The light source may be any suitable light source applicable for the intended purpose. In one embodiment of the disclosure, the light source comprises at least two LED lamps to illuminate the two or more light pipes. The at least two or more light sources may be arranged adjacent to and directed towards the two or more light pipes. The light is then radiated away from the light pipe along the length of the light pipe.

The light source may comprises one or more LED's, one or more OLED's, a similar display technology, a surface lit plastic sheet, such as Acrylite® (Evonik Industries), LASER diodes or any combination thereof. The at least one light source may be attached to a printed circuit board (PCB). The printed circuit board can include additional light sources, optionally positioned adjacent to light receiving surfaces to direct light into the light pipe. Generally, the light source is hidden and cannot be seen from the outside. The at least one light source may be electrically-connected to the vehicle and is configured to emit light based on at least receiving electrical power from the vehicle, such as from an electrical power source (e.g. vehicle electrical system, battery, etc.) on the vehicle. As non-limiting examples, the at least one light source may be electrically-connected to the vehicle by way of one or more wiring harnesses or other suitable electrical connectors as may be understood by the skilled person.

Generally, the two or more light sources are arranged adjacent to and directed towards the light pipe. Other locations and directions of the light sources are possible and within the skilled persons knowledge. The two or more light sources, while unlit and emitting no light, are advantageously concealed behind the transparent and/or translucent coating coated on the lens.

The two or more light pipes are light pipes generally used in automotive applications. With the disclosure it is proposed that the light guide is substantially transparent and without any visible discrete optic features in an un-lit state, while being diffusive in a lit state. But the light guide annulus can also be substantially transparent and non-diffusive in both a lit and un-lit state, while the circumferential flanges or cylinders are substantially transparent in an un-lit state, while being diffusive in a lit state.

In one embodiment of the disclosure, the light pipe comprises a clear polymeric material. The clear polymeric material may be selected from the group consisting of polyacrylate, such as poly(methyl methacrylate) (PMMA), polyester, polystyrene, polyethylene, polypropylene, polyamides, polyamides, polycarbonate, epoxy, phenolic, acrylonitrile-butadiene-styrene, acrylonitrile-styrene-acrylates, acetal and blends of these. Preferred substrate materials include polycarbonate, poly(2,2'-dihydroxyphenylpropane) carbonate, polydiethyleneglycol bis(ally! carbonate), polymethylmethacrylate and polystyrene, or blends thereof. In one embodiment the light pipe is made from PMMA. Here, the term "light pipe" can be used to refer to a tubular structure that is adapted to transport light. Light might be coupled into the light pipe at one, or at both ends of the light pipe. The light is then being radiated from the light tube along its length, or at least along part of its length.

According to this disclosure one or more light pipes may be used in the system, wherein for example 2, 3, 4, 5 or more light pipes may be used, but in another embodiment only one light pipe is used.

In one embodiment of the disclosure, the two or more light pipes may be adapted to sequentially radiate the light from the at least two LED lamps. In the description the term "sequentially" can be used to refer to a light sweep effect. For example, light might sweep from the center of the vehicle outwards to promote direction of travel, where the light has the appearance of a continuous even illumination. Therefore, the light pipe could comprise reflecting and/or diffusing elements for creating the light sweep effect.

In one embodiment, the housing behind the light guide is shaped to promote reflection of light back into the adjacent environment.

In one aspect of the disclosure, the one or more light pipes comprise a cladding layer on the outside of a core or rather core tube. The cladding may be the same for one specific light pipe. In one embodiment, different cladding layers are used at different parts of the light pipe. The cladding may also be different from one light pipe to another light pipe. It is also encompassed by the present disclosure that only parts of one or more light pipe are covered by a cladding layer. The makeup of the cladding layer may be such that it has diffusive/speculative elements in it to create a glow.

The cladding layer supports light reflection within the light pipe so that the overall illumination performance of the light pipe is increased and the light can be transported over longer distances without loss of light intensity, light color and/or light brightness.

The cladding is made from a material generally used in the automotive field or any other related field. For example, the cladding layer may be made from a material selected from the group consisting of fluorocarbon polymer, substituted polymers, or the like. In one embodiment, the cladding layer is made from a fluoropolymer. In one example, the light pipe with a cladding layer is a 3M Light String Ray Milky Flex 35 or Ray Milky Flex 63. The cladding layer may have thickness sufficient to provide the desired property but not too thick to reduce the efficiency (less light is reflected back in to the light pipe and exit later if too thick) and have too much light exiting early and reducing the homogeneity of the light output. In one embodiment the layer may have a thickness of about 0.01-0.5 mm, such as 0.05-0.5 mm or 0.05-0.2 mm.

The cladding layer has a different refractive index compared to the refractive index of the core of the respective light pipe. For example, the cladding layer has a refractive index that is lower than the refractive index of the core of the respective light pipe.

With the system of the disclosure the light is output from the one or more light pipes with a substantially uniform luminance. In addition or optionally, the light output is color stable.

The present disclosure particularly provides a system in which light efficiency in a 360° illuminated light pipe across the entire length is increased and which makes it possible to increase the length of the light pipes for this 360° purpose. With the disclosure, the chances of light loss within the light pipe due to refraction is reduced and/or eliminated. This is achieved by using the cladding, optics, a plurality of screen printed dots, a paint and/or a further coating on the light pipes and by overlapping parts of the light pipes.

Light loss reduction can also be achieved according to the present disclosure by making usage of a plurality of small contact areas for example formed by applying a velvet film between the one or more light pipes and the transparent and/or translucent coating. Such a velvet film may comprise polymers such as polyester, polyurethane, poly(meth)acrylates, metals, metal alloys, metal salts, or mixtures thereof. Example of suitable materials are polyethyleneterephthalate (PET) and polycarbonate (PC). The velvet film can be provided as a velvet surface finish on the light pipe(s) or a mask.

Light pipe ends may overlap in only small parts or even in large parts. Generally, the light pipe(s) is/are designed and orientated in a way that hides the one or more light sources in order to create 360° illumination. According to the present disclosure, the term "360° illumination" refers to the fact that two ends of the light pipe(s) meet and/or connect. For example, the overlap is between an end part of one light pipe and an end part of a second light pipe located near the respective light source thereof, or the overlap is between the two ends of one light pipe. In another example, in case two light pipes are used, the end of light pipe one overlaps with the start of light pipe two at a position near the light source of light pipe two, wherein the end of light pipe two overlaps with the start of light pipe one at a position near the light source of light pipe one. With this design a complete 360° illumination can be achieved, such that in particular a circular illumination around a car part, like a button, a load speaker, a display and the like can be provided.

Additionally, focusing optical geometry may be included in the system to increase the amount of reflected light rays back into the light pipe. This geometry can be varied around the circumference of the light pipe to improve the homogeneity of the overall light output of the light assembly. This geometry may reduce the incidence angles of light rays entering the light pipe. Coupled with varying the geometry around the circumference of the light pipe may improve the homogeneity of the overall light output of the light assembly.

The system provided herein may also encompass at least one mask located between the one or more light pipes and the lens. The mask within the inventive system may provide a desired pattern of illumination for the system, i.e. an illumination window. Generally, the mask is a kind of a stencil that has translucent and non-translucent zones, wherein the former allow light transmission from the at least one light source therethrough, so that only a specific pattern is illuminated once light from the light source and/or the light pipe(s) is applied to the mask. For example, the pattern may be printed or lasered onto the mask, wherein any printing technique may be used to prepare the desired pattern. Etching processes known in the art could also be used for this purpose. The pattern or image is a dedicated part that the stencil is placed on.

In one embodiment of the disclosure at least one gasket is part of the system. The gasket may be positioned at the inner part of the system, i.e. inside of the system next to the light pipe. The gasket may push the parts of the system against the lens to keep the light pipe as close as possible to the outside surface. The gasket may additionally and/or exclusively be located between the light pipe and the mask, preferably surrounding the edges of the mask.

In one embodiment the present disclosure is directed to a vehicle design element comprising the system provided herein.

In one embodiment, the system may be used in other vehicle components, such as rear view devices. For example, the system may be comprised by a housing for a side turn indicator of a rear view device of a vehicle with the side turn indicator comprising at least one light element.

In one embodiment, the system provided herein may be used as a door finisher for automotive doors or any other part of the vehicle.

BRIEF DESCRIPTION OF THE DRAWINGS

Embodiments of the present disclosure will be discussed with reference to the accompanying drawings wherein:

FIG. 1 is a schematic perspective view of a system including an assembly according to an embodiment of this disclosure.

FIG. 2b is a perspective view of a sub-assembly with the light assembly of FIG. 2a.

DETAILED DESCRIPTION

Figure 2A:
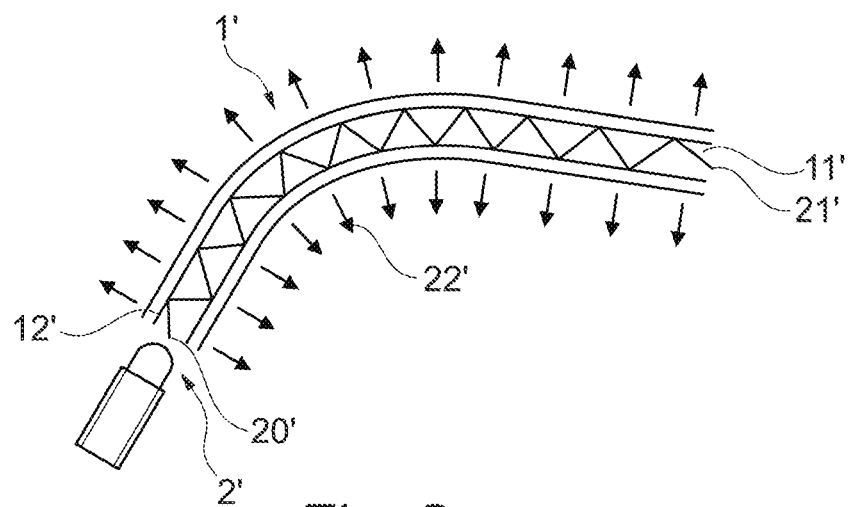
FIG. 2a is a schematic top view of a part of a light assembly with one light source and one light guide.

Referring now to FIG. 1, there is shown a simplified schematic assembly of a system 10 of this disclosure, with light pipes 1 and light sources 2. In detail, the system 10 has two overlapped light pipes 1a and 1b and three light sources 2a, 2b, 2c. The light pipes 1 are covered by a cladding layer (not shown) to improve reflectivity and thus ensure a consistent and even light output. A lens with a coating is also not shown, and the lens comprises a transparent and/or translucent metal layer which, in use, is translucent. The light sources 2 are each switchable between an on state in which the light is visible on the front surface of the lens and an off state in which no light is visible on the front surface front surface of the lens.

As can be seen from FIG. 1, there is a first overlap between the light pipes 1a and 1b near the light source 2a and a second overlap between the light pipes 1a and 1b near the light source 2b. In fact, light is inputted into the two ends of the light pipe 1a via the light sources 2a and 2c, whereas only one end of the light guide 1b is receiving light from the light source 2b. All three light sources 2a, 2b, 2c are connected to a printed circuit board 3.

With this arrangement of the two light pipes 1a, 1b overlapping such that a loop is provided and three light sources 2a, 2b, 2c emitting light into said overlapping light pipes 1a, 1b, together with the cladding, the lens and the coating, an homogenous constant 360° illumination is achieved.

Figure 2B:
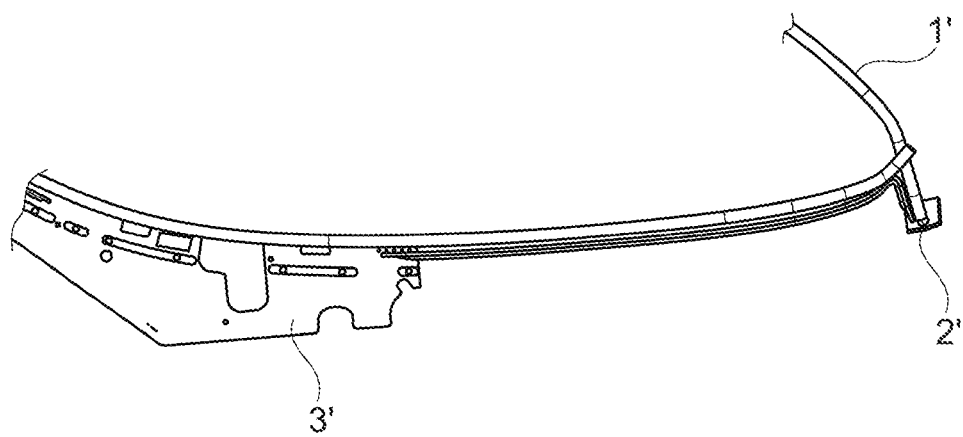
Figure 2C:
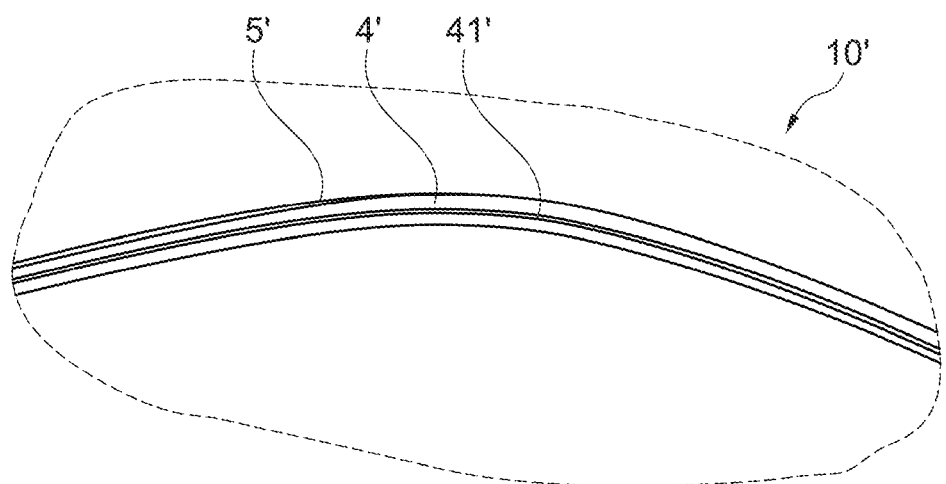
FIG. 2c is a front view of a part of a system according to a further embodiment of this disclosure making usage of the sub-assembly shown in FIG. 2b.

FIGS. 2a to 2c depicts a further system 10' according to this disclosure, which makes usage of a single light pipe 1' which is flexible and cylindrical. Said single light pipe 1' comprises a core 11' surrounded by a cladding 12' as best seen in FIG. 2a. A light source 2' emits light 20' into the light pipe 1, with said emitted light 20' being split into light 21' reflected by the cladding 12' and diffuse light 22' exiting the light pipe 1'.

The two ends of the light pipe 1' do overlap in order to form a closed loop, which for example can be in form of a circle or oval, with the one light source 2' being sufficient to provide the required diffuse light 22'. As can be seen in FIG. 2b, the light source 2' is connected to a printed circuit board 3'.

The assembly described with respect to FIGS. 2a and b is completed by arranging a mask 4' around the light pipe 1' and arranging a lens 5' along the circumference of the arrangement, see FIG. 2c. The mask 4' is providing an illumination window 41'. The lens 5' is provided with a not shown chromium-based reflective coating.

The illumination window 41' of the mask 4' is no greater in width than the light pipe 1'. The mask 4' is applied over the light pipes so that the light is visible through the mask illumination window 41'. The mask window 41' has varying transmission levels such that it is less transmissive at the light pipe overlap so the brighter light emission at the light pipe overlap is absorbed more than at other areas of the 360° illumination window 41'. Hence the viewer of the 360° illumination sees a homogenous luminance level of light.

The geometry of the light pipe 1', the overlap of the two ends of the light pipe 1', the cladding 12' of the light pipe 1', the arrangement of the light source 2' in front of one of the ends of the light pipe 1', the mask 4', the lens 5' and the coating on the lens 5' co-operate such that light exits the illumination window 41' in a homogenous manner and provides a circular or oval 360° illumination.

The illumination window 41' can be used to provide a frame around a not shown display or the like within a vehicle.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope of the disclosure as set forth and defined by the following claims.

REFERENCE SIGNS

1, 1a, 1b, 1' light pipe
2, 2a, 2b, 2c, 2' light source
3, 3' printed circuit board
4' mask
5' lens
10, 10' system with light assembly
11' core
12' cladding
20' emitted light
21' reflected light
22' diffuse light
41' illumination window It is claimed:

1. A system comprising a light assembly for illumination of a vehicle design element, comprising:
  a plurality of light pipes, each comprising a core;
  one or more light sources, each of the one or more light sources being disposed adjacent to and directed toward one or more of the plurality of the light pipes, wherein light emitted from the one or more light sources is split into reflected light that propagates within the core of one or more of the plurality of light pipes and diffuse light that exits one or more of the plurality of light pipe; and
  a lens having an inner surface and an outer surface disposed opposite the inner surface, the lens including a continuous transparent and/or translucent coating on the outer surface,
  wherein the continuous transparent and/or translucent coating is at least partially permeable to at least some of the diffuse light which is passed through the lens,
  wherein the continuous transparent and/or translucent coating comprises a metal, an alloy or a conductive metalloid, providing a chromium or chromium-based reflective coating, and
  wherein end portions of at least two of the plurality of light pipes extend over each other, providing a loop in a plane with at least one region of vertical overlap from an orthogonal view of the plane.

2. The system of claim 1, further comprising a cladding, optics, a plurality of screen printed dots, a paint, or a further coating on the plurality of light pipes for providing a diffuse, homogenous light output from the one or more light pipes.

3. The system of claim 2, wherein each of the plurality of light pipes comprises a cladding surrounding the core such that emitted light is at least partly reflected by the cladding to propagate within the core.

4. The system of claim 3, wherein the cladding is made from a material selected from the group consisting a fluoropolymer, fluorocarbon polymer and substituted polymer.

5. The system of claim 3, wherein the cladding has a different refractive index compared to the core of each of the plurality of light pipes.

6. The system of claim 1, wherein each light pipe is flexible and cylindrical.

7. The system of claim 1, wherein light emitted from the one or more light sources is output from the one or more light pipes with a substantially uniform luminance.

8. The system of claim 7, wherein light output from the one or more light pipes is color stable.

9. The system of claim 1, wherein the one or more light sources comprise at least one of an incandescent light source, a light-emitting diode (LEDs), an organic light-emitting diodes (OLED), or a LASER diode.

10. The system of claim 1, wherein the plurality of light pipes comprise a clear polymeric material.

11. The system of claim 10, wherein the polymeric material is selected from the group consisting of polyacrylate, polyester, polystyrene, polyethylene, polypropylene, polyamides, polyamides, polycarbonate, epoxy, phenolic, acrylonitrile-butadiene-styrene, acrylonitrile-styrene-acrylates, acetal and blends of these.

12. The system of claim 10, wherein the polymeric material is as polymethyl methacrylate (PMMA).

13. The system of claim 12, wherein the plurality of light pipes including light diffusing elements.

14. The system of claim 13, wherein the plurality of light pipes generate a substantially uniform light output.

15. A vehicle design element comprising the system of claim 1.

16. A rear view device of a vehicle comprising the system of claim 1.

17. A door finisher for automotive doors comprising the system of claim 1.

18. The system of claim 1, wherein a translucency of the continuous transparent and/or translucent coating depends on at least one characteristic of the plurality of light pipes or the one or more light sources.

19. The system of claim 18, wherein the at least one characteristic is determined by at least one of cladding, optics, screen printed dots, or a plurality of contact areas.

20. The system of claim 1, wherein the plurality of light pipes comprise a first light pipe and a second light pipe, wherein the one or more light sources comprise a first light source disposed adjacent to a first end of the first light pipe and a second light source disposed adjacent to a first end of the second light pipe, wherein the first end of the first light pipe and the first end of the second light pipe overlap.

21. The system of claim 20, wherein the one or more light sources further comprise a third light source disposed adjacent to a second end of the first light pipe, wherein the second end of the first light pipe and a second end of the second light pipe overlap.

* * * * *